United States Patent [19]

Bettermann

[11] 4,125,208
[45] Nov. 14, 1978

[54] APPARATUS FOR DEGASSING AND SUPPLYING PLASTIC MATERIAL TO PROCESSING MACHINES

[75] Inventor: Dieter Bettermann, Cologne, Fed. Rep. of Germany

[73] Assignee: SAPCO Systemanalyse und Projektberatung GmbH, Düsseldorf, Fed. Rep. of Germany

[21] Appl. No.: 801,381

[22] Filed: May 27, 1977

[30] Foreign Application Priority Data

May 28, 1976 [DE] Fed. Rep. of Germany ....... 2623823

[51] Int. Cl.² .............................................. B29B 1/10
[52] U.S. Cl. ..................................... 222/152; 222/236; 366/75; 366/76; 366/155; 366/186; 425/203
[58] Field of Search .................... 259/11, 185, 195; 425/203, 812, DIG. 60; 222/152, 236; 264/102; 366/75, 76, 155, 186

[56] References Cited

U.S. PATENT DOCUMENTS

| 2,868,144 | 1/1959 | Ambrette | 425/203 X |
| 3,036,335 | 5/1962 | Heston et al. | 264/102 |
| 3,563,514 | 2/1971 | Shattuck | 425/203 X |

FOREIGN PATENT DOCUMENTS

| 1,059,216 | 2/1967 | United Kingdom | 425/203 |
| 464,506 | 9/1975 | U.S.S.R. | 222/152 |

Primary Examiner—David A. Scherbel
Attorney, Agent, or Firm—Walter Becker

[57] ABSTRACT

Apparatus for supplying granular and pulverous thermoplastic materials, duroplastic materials, rubber, or similar materials to processing machines, such as extruders. The apparatus includes a charging hopper with conduit-like devices for withdrawing gases which are released from the material. A plurality of vacuum connections arranged one above another respectively degas pertaining layers of the material which is in the hopper.

14 Claims, 2 Drawing Figures

APPARATUS FOR DEGASSING AND SUPPLYING PLASTIC MATERIAL TO PROCESSING MACHINES

BACKGROUND OF THE INVENTION

1. Field of the Invention

The present invention relates to an apparatus for supplying granular or pulverous thermoplastic and/or duroplastic materials and/or rubber and/or similar materials to a processing or treating machine, for example an extruder, according to which the apparatus has a charging hopper with conduit-like devices for drawing off the gases which are released from the material.

The term "plastic material" as used in this specification and in the claims refers to all suitable thermoplastic and duroplastic materials, to rubber, and to equivalent materials. For the sake of simplicity, the term "plastic material" will be used to cover all these materials.

2. Description of the Prior Art

From the U.S. Pat. No. 3,489,830 (Grigull), an apparatus of the above mentioned type is known through which plastic material is supplied to an extruder. With this heretofore known apparatus, the material passes through two hoppers, which are arranged one above the other, prior to the material passing out of the outlet of the lower hopper into a conveying screw which conveys the material to the extruder. A vacuum exists in these two hoppers, whereby a degasification of the plastic raw material is achieved; the material is freed of monomerous residual constituents, oxygen, water vapor, and other gases. If these gases are not withdrawn, the extruded product contains gas occlusions, imperfections in the chemical structure, and/or similar flaws. Since the gas particles which are to be withdrawn are essentially formed in the vicinity of the conveying screw because the material in that area has a higher temperature, the heretofore known apparatus is equipped within the lower hopper with one or more conduits or a conduit-like lining which withdraws the gas only a few millimeters above the conveying screw and guides the gas upwardly through the hopper to relatively close beneath the top of the hopper, where the greatest vacuum or underpressure exists.

Such an arrangement has the drawback that those gas particles which are not withdrawn at the conveying screw rise in the hopper under the influence of the vacuum and thus pass through all of the material which is present in the hopper. In this connection, these gas particles are even enriched by those gas particles which are themselves released in the hopper. Despite the withdrawal at the outlet of the hopper, quantities of gas can thus pass through the hopper and the material present therein up to the top, resulting in an undesired condensation which can only be removed with difficulty. During the operation, even a constant increasing concentration of the undesired gases occurs in the plastic material, so that eventually a final withdrawal of the condensates which wet the material to an excessive extent is no longer possible.

SUMMARY OF THE INVENTION

It is an object of the present invention to produce an apparatus of the above described general type which avoids the described drawbacks and with which a uniform and complete degasification of the plastic material in the hopper may be carried out.

BRIEF DESCRIPTION OF THE DRAWINGS

This object and other objects and advantages of the present invention will appear more clearly from the following specification in connection with the accompanying drawing in which.

DESCRIPTION OF THE PREFERRED EMBODIMENTS

Figure 1:
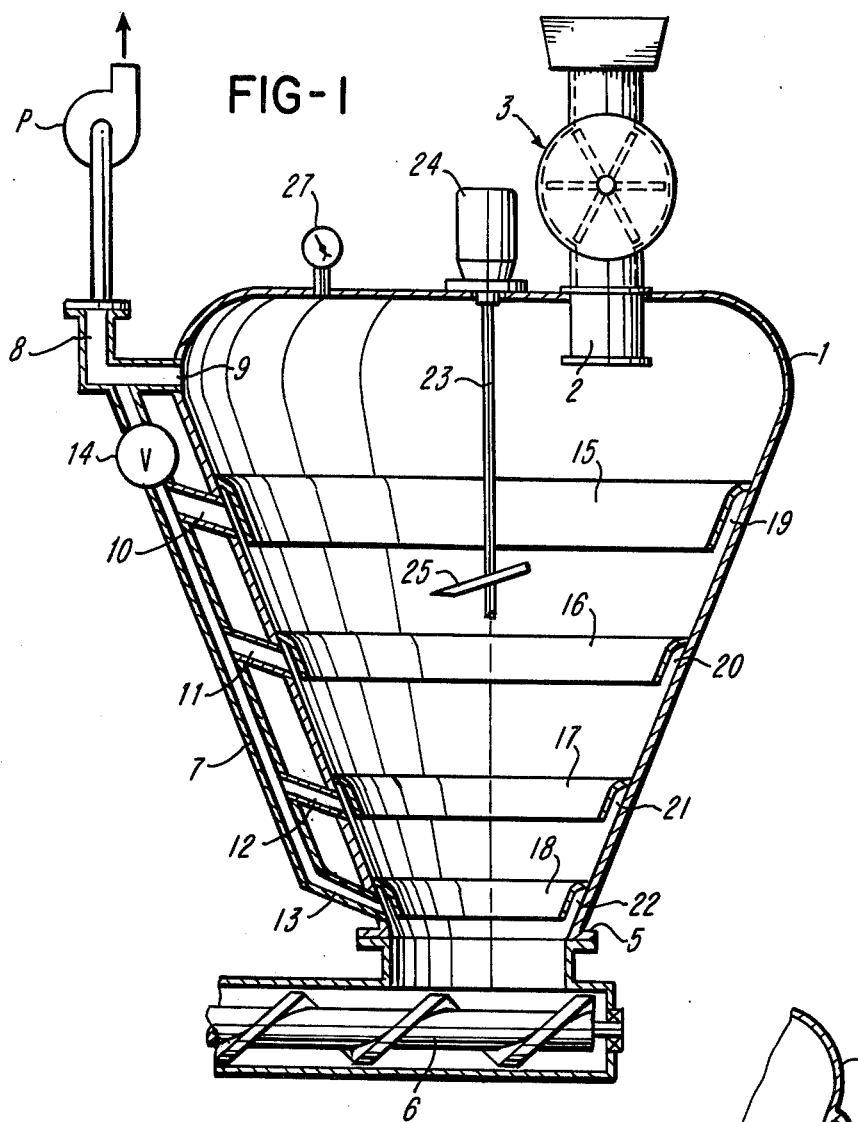
FIG. 1 is a schematic illustration of a vertical longitudinal section through a hopper pursuant to the present invention for supplying plastic material to the conveying screw of an extruder.

The apparatus according to the present invention is characterized primarily in that the hopper or receptacle comprises a plurality of vacuum connections which are arranged one above another for degasification in layers of the material which is present in the hopper.

A primary advantage of the degasification by layers pursuant to the present invention consists in that the undesired gases may not only be withdrawn from the lowermost layer of material, but also from all areas which the plastic material traverses on its way through the receptacle. In this way, no excessive concentrations can occur anymore. A further important advantage of the present invention consists in that a single hopper suffices for supplying material and for simultaneous degasification.

Referring now to the drawing in detail, the receptacle or hopper 1 is funnel-shaped and, on top, has a feeding or filling device 3 for the plastic material. The filling device 3, for example a sealed compartment or dosing wheel, is closable by means of a valve 2. Below, by means of a flange connection 5, is attached a plastic treatment or processing machine in the form of an extruder with a conveying screw or worm 6. Laterally on the outside of the wall of the receptacle 1 is arranged a conduit 7 which, by means of a flange connection 8, is attachable to a vacuum pump. Short connecting conduits 9, 10, 11, 12 and 13 lead from this pipe 7 to the receptacle 1, forming vacuum connections. A valve 14 is located in the pipe 7 between the flange connection 8 and the connecting conduit or vacuum connection 10. The lowermost vacuum connection 13 is near the flange 5 at the bottom of the receptacle 1. This arrangement has the advantage that the receptacle 1 may be dismounted without having to additionally separate the conduit 7 from the extruder.

Within the receptacle 1 annular aprons 15, 16, 17 and 18 extend over the vacuum connections 10, 11, 12 and 13. These aprons 15–18 are designed in such a way that at the level of the vacuum connections 10–13, material-free annular spaces 19, 20, 21 and 22 are formed. In this way, the accumulation and withdrawal of layers of gases which are present within the receptacle 1 is carried out particularly easily. In addition, the receptacle 1 is further equipped with an only partially shown agitator or stirrer 23 which has an electric motor 24. The stirrer 23 also has stirring blades 25, of which only one blade is shown, which, by means of a corresponding profiling and angular adjustment, causes loosening up and an improved degasification of the plastic material in the receptacle 1.

The operation of the apparatus is as follows: the receptacle 1 is filled with plastic material by means of the filling device or opening 3, with its dosing wheel, and the valve 2; is closed off; and subsequently, through the vacuum connection 9, a vacuum is generated therein. When a pressure of 25 mm Hg (as regulated by the pressure measuring valve 27) is achieved in the receptacle 1, the valve 14 in the pipe 7 is opened, whereby the vacuum is uniformly generated. The plastic material is then uniformly degassed by means of the annular spaces 19, 20, 21 and 22 which are formed by the aprons 15, 16, 17 and 18. The desired uniformity of the degasification is achieved by the increase in cross section of the vacuum connections 10, 11, 12 and 13 from the bottom to the top of the receptacle 1, and specifically, so that the respective cross section is proportional to the amount of material in the receptacle 1 at the level of the pertaining vacuum connection. Moreover, the stirrer 23 provides for a constant redistribution and loosening of the plastic material. In this connection, the aprons and the operating vacuum below 25 mm Hg prevent the material from being drawn into the vacuum connections.

Figure 2:
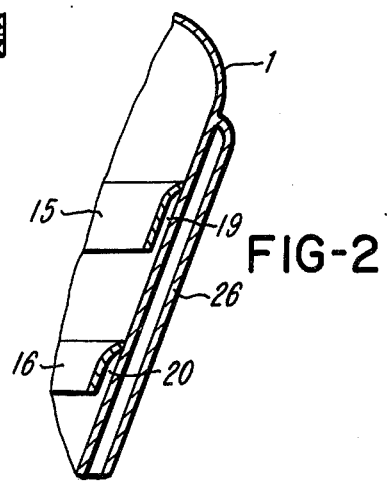
FIG. 2 shows a modification of the wall of the hopper of FIG. 1.

The number of vacuum connections on the receptacle 1 may, to a large extent, be varied. With normal size receptacles, three to four connections are expedient. The receptacle 1 may be double walled, as shown in FIG. 2 at 26, or may be provided with coils of pipe 26p. In this way, the wall of the receptacle 1 may be cooled as well as, in particular, heated. To this end, for example, a suitable medium may be introduced between the walls or into the pipe coils.

When the material level in the receptacle 1 drops for example to the level of the apron 15, the pipe 7 is closed off by the valve 14 so that the air which is possibly entrapped may be withdrawn directly through the vacuum connection 9. After completing the refilling process, the valve 2 is closed. When a pressure of 25 mm Hg is achieved in the receptacle 1, the valve 14 is again opened, so that the vacuum once again encompasses the entire interior of the receptacle. By so doing, the illustrated receptacle 1 makes a second costly receptacle, as a post fill chamber, unnecessary. With the same considerations, it is possible to provide for example the vacuum connections 10 and 11 with a valve (not shown) in order to allow the level of the material in the receptacle to drop even further before refilling is necessary.

It is, of course, to be understood that the present invention is by no means limited to the specific showing in the drawing, but also encompasses any modifications within the scope of the appended claims.

What I claim is:

1. An apparatus for supplying granular and pulverous plastic material selected from the group consisting of thermoplastics, duroplastics, rubber, and similar materials to a processing machine, particularly to an extruder, which comprises:
    a charging hopper;
    a plurality of vacuum connections arranged one above another on said hopper and respectively having a mouth opening into said hopper; and
    conduit means connected to said vacuum connections and connectable to a vacuum pump, the mouth of each successive vacuum connection having a diameter less than the diameter of the mouth of the next higher vacuum connection.

2. An apparatus according to claim 1, which includes at least three vacuum connections.

3. An apparatus according to claim 1, in which said hopper has conical walls and aprons associated with said vacuum connections, said aprons respectively defining, with those portions of said walls of said hopper adjacent to said mouths of said vacuum connections, chambers which are closed above the pertaining mouths and open below the pertaining mouths.

4. An apparatus according to claim 3, in which said aprons define annular chambers.

5. An apparatus according to claim 1, in which said conduit means includes a pipe common to all of said vacuum connections.

6. An apparatus according to claim 5, in which said pipe is located outside of said hopper.

7. An apparatus according to claim 1, in which one valve means with at least said conduit means is located underneath level of the uppermost vacuum connection for closing at least said conduit means.

8. An apparatus according to claim 7, in which said valve means is operable to open in response to a minimum vacuum in said hopper of 25 mm Hg.

9. An apparatus according to claim 1, in which said hopper is provided with filling means for receiving material.

10. An apparatus according to claim 9, in which said filling means includes a dosing wheel sealed against a vacuum.

11. An apparatus according to claim 1, in which said hopper is provided with stirring means for loosening up material introduced into said hopper.

12. An apparatus according to claim 1, in which at least a portion of said hopper is double-walled for cooling and heating of said hopper.

13. An apparatus according to claim 1, in which at least a portion of said hopper is provided with coils of pipes for cooling and heating of said hopper.

14. An apparatus for supplying granular and pulverous plastic material selected from the group consisting of thermoplastics, duroplastics, rubber, and similar materials to a processing machine, particularly to an extruder, which comprises:
    a charging hopper having conical walls;
    a plurality of vacuum connections arranged one above another on said hopper and respectively having a mouth opening into said hopper, the mouth of each successive vacuum connection having a diameter less than the diameter of the mouth of the next higher vacuum connection;
    conduit means connected to said vacuum connections and connectable to a vacuum pump; and
    aprons respectively defining, with those portions of said walls of said hopper adjacent to said mouths of said vacuum connections, chambers which are closed above the pertaining mouths and open below the pertaining mouths.

* * * * *